United States Patent
Bednarz et al.

(10) Patent No.: US 7,604,893 B2
(45) Date of Patent: Oct. 20, 2009

(54) ELECTROLYTE MATRIX, PARTICULARLY FOR A MOLTEN CARBONATE FUEL CELL, AND METHOD FOR THE PRODUCTION THEREOF

(75) Inventors: Marc Bednarz, Ottobrunn (DE); Birgit Hilke, Neufinsing (DE)

(73) Assignee: MTU CFC Solutions GmbH, Ottobrunn (DE)

( * ) Notice: Subject to any disclaimer, the term of this patent is extended or adjusted under 35 U.S.C. 154(b) by 508 days.

(21) Appl. No.: 10/530,428

(22) PCT Filed: Oct. 11, 2003

(86) PCT No.: PCT/EP03/11284

§ 371 (c)(1), (2), (4) Date: Apr. 5, 2005

(87) PCT Pub. No.: WO2004/036681

PCT Pub. Date: Apr. 29, 2004

(65) Prior Publication Data

US 2006/0110654 A1    May 25, 2006

(30) Foreign Application Priority Data

Oct. 15, 2002    (DE) ............................... 102 47 997

(51) Int. Cl.
*H01M 8/14* (2006.01)
*H01M 8/08* (2006.01)
*C04B 35/00* (2006.01)

(52) U.S. Cl. ........................... 429/46; 429/16; 501/153

(58) Field of Classification Search ................... 429/16, 429/46; 501/153
See application file for complete search history.

(56) References Cited

U.S. PATENT DOCUMENTS

| 4,079,171 A | 3/1978 | Marianowski et al. |
| 4,251,600 A * | 2/1981 | Sim et al. ..................... 429/12 |
| 4,480,017 A | 10/1984 | Takeuchi et al. |
| 5,595,832 A | 1/1997 | Tomimatsu et al. |
| 2004/0062981 A1 * | 4/2004 | Friedrich ..................... 429/46 |

FOREIGN PATENT DOCUMENTS

| DE | 4030945 | 4/1992 |
| DE | 19935271 | 2/2001 |
| DE | 100 60 052 A | 8/2002 |
| JP | 63170863 | 7/1988 |
| WO | WO 01/70626 A1 | 9/2001 |

* cited by examiner

*Primary Examiner*—Mark Ruthkosky
*Assistant Examiner*—Karie O'Neill
(74) *Attorney, Agent, or Firm*—Lucas & Mercanti, LLP; Klaus P. Stoffel

(57) ABSTRACT

Disclosed are an electrolyte matrix, particularly for a molten carbonate fuel cell, comprising a matrix material which contains one or several lithium compounds, aluminum oxide, and a carbide, and a method for the production thereof. The inventive matrix material contains a combination of lithium carbonate, aluminum oxide, and titanium carbide. Said matrix material can be produced in a simple manner from inexpensive materials that are available at the required degree of fineness, has a high degree of solidity in both the green state and the sintered state, and has good storage properties in the green state.

20 Claims, No Drawings

ELECTROLYTE MATRIX, PARTICULARLY FOR A MOLTEN CARBONATE FUEL CELL, AND METHOD FOR THE PRODUCTION THEREOF

PRIORITY CLAIM

This is a 35 U.S.C. §371 National Stage International Application No. PCT/EP2003/011284, filed on Oct. 11, 2003. Priority is claimed on that application and on the following application:
Country: Germany, Application No. 10247997.6, Filed: Oct. 15, 2002.

BACKGROUND OF THE INVENTION

The invention concerns an electrolyte matrix, especially for a molten carbonate fuel cell. The electrolyte matrix consists of a matrix material that contains one or more lithium compounds, aluminum oxide, and a carbide. The invention also concerns a method for producing the electrolyte matrix.

To produce electric energy by means of fuel cells, a large number of fuel cells is usually arranged in the form of a stack. Each fuel cell has an anode, a cathode, and an electrolyte matrix arranged between them. The individual fuel cells are separated from each other by bipolar separators and are electrically contacted, and current collectors are provided at the anodes and the cathodes for electrically contacting them and for furnishing these electrodes with the fuel gas or the cathode gas. Sealing elements are provided at the edges of the anode, cathode, and electrolyte matrix, which form a lateral seal of the fuel cells and thus of the fuel cell stack to prevent anode and cathode material and electrolyte matrix material from escaping. The molten electrolyte fixed in the porous matrix typically consists of binary or ternary alkali metal carbonate melts. During operation, molten carbonate fuel cells typically reach operating temperatures of 600-650° C.

The matrix material of the electrolyte matrix has a number of jobs to perform. First of all, the matrix serves as a reservoir and substrate material for the electrolytes. A well-defined, highly porous structure of the matrix is a prerequisite for a high storage capacity. In addition, the matrix electrically insulates adjacent fuel half-cells and separates their gas compartments. Another requirement placed on the electrolyte matrix is that it must be capable of withstanding thermal tensile stresses induced by different coefficients of thermal expansion of the electrolyte matrix and the metallic components of the fuel cell and the fuel cell stack, especially the lateral sealing elements, that surround the electrolyte matrix. Tensile stresses of this type can cause cracking in the matrix, especially when the fuel cells are started up, and can thus lead to a reduction of power output and service life.

DE 100 60 052 A1 describes an electrolyte matrix, especially for a molten carbonate fuel cell, and a method for producing it, in which the matrix material contains one or more lithium compounds, aluminum oxide, and one or more zirconium compounds. When the fuel cell is started up, the matrix material undergoes a volume increase, which is intended to prevent cracking of the matrix due to different coefficients of thermal expansion of the matrix and the metallic components that surround it. This happens as a result of the synthesis of the matrix material when the fuel cell is started up, accompanied by an increase in volume. This previously known electrolyte matrix contains zirconium carbide to achieve a volume increase during the start-up of the fuel cell. A disadvantage of this previously known matrix is that it does not have the desired high strength either in the "green" state, i.e., before synthesis by the start-up of the fuel cell, or in the synthesized, i.e., sintered, state. Another disadvantage is that the zirconium carbide that is used is expensive and difficult to produce. Finally, the storage stability of this previously known matrix in the "green" state is limited.

DE 199 35 271 C2 describes a matrix material for a fuel cell, especially a molten carbonate fuel cell, which can be produced from a slurry filling by shaping and drying and contains one or more oxide ceramic powders, binders, plasticizers, and/or antifoaming agents. This previously known matrix material also contains homogeneously admixed oxidic secondary nanoparticles and is intended to offer high ductility and at the same time high strength.

DE 40 30 945 A1 describes a matrix material for a molten carbonate fuel cell, which contains a mixture of lithium aluminate and lithium zirconate.

Finally, U.S. Pat. No. 4,079,171 describes a molten carbonate fuel cell, in which the matrix contains principally lithium aluminate with a crystalline structure.

SUMMARY AND DESCRIPTION OF THE INVENTION

The objective of the invention is to specify an electrolyte matrix, especially for a molten carbonate fuel cell, which has high strength and good storage stability and can be inexpensively produced. A further objective of the invention is to specify a method for producing an electrolyte matrix of this type.

The invention creates an electrolyte matrix, especially for a molten carbonate fuel cell, which consists of a matrix material that contains one or more lithium compounds, aluminum oxide, and a carbide. In accordance with the invention, the matrix material contains a combination of lithium carbonate, aluminum oxide, and titanium carbide.

An advantage of the electrolyte matrix of the invention is that during the start-up and operation of the fuel cell, the lithium carbonate together with the aluminum oxide can undergo complete synthesis to lithium aluminate. This results in greater strength and improved storage stability, especially in the "green" state, compared to other matrix materials that contain lithium compounds. The use of titanium carbide results in a surprisingly significant increase in the strength of the electrolyte matrix in the sintered state.

In accordance with a preferred refinement of the invention, the matrix material additionally contains aluminum hydroxide. This acts as a sintering aid and produces an increase in the breaking strength of the matrix.

In addition, the matrix material can contain nanoscale secondary particles.

The nanoscale secondary particles can be one or more of $ZrO_2$, $SiO_2$, $Al_2O_3$, and $TiO_2$.

In a preferred embodiment, the matrix material undergoes synthesis during the start-up of the fuel cell, accompanied by an increase in volume.

Preferably, the matrix material undergoes synthesis during the start-up of the fuel cell, especially with the formation of lithium aluminate and lithium titanate. The titanium carbide contained in the matrix material is converted to lithium titanate during the start-up of the fuel cell, and this is accompanied by a reduction of the specific gravity and thus an increase in volume. An advantage is that titanium carbide is readily and inexpensively available in the required fineness.

In accordance with the invention, after the start-up of the fuel cell, the electrolyte matrix preferably has an open porosity of 30-70%, and especially 50-70%.

The volume increase at which the material matrix undergoes synthesis during the start-up of the fuel cell is preferably 2.5-5%, and especially 3-4%.

In addition, the invention creates a method for producing an electrolyte matrix, especially for a molten carbonate fuel cell, from a matrix material that contains one or more lithium compounds, aluminum oxide, and a carbide. In accordance with the invention, the matrix material contains a combination of lithium carbonate, aluminum oxide, and titanium carbide.

An important advantage of the method of the invention consists in the possibility of complete synthesis of the matrix material. Since the raw materials provided for the method of the invention are commercially available, inexpensive, and already in the required degree of fineness, the method does not require an additional expensive grinding process.

In accordance with an advantageous refinement of the method of the invention, the matrix material additionally contains aluminum hydroxide. In the subsequent synthesis of the matrix material, the aluminum hydroxide acts as a sintering aid and produces an increase in the breaking strength of the matrix.

In addition, the matrix material can contain nanoscale secondary particles.

The nanoscale secondary particles can be one or more of $ZrO_2$, $SiO_2$, $Al_2O_3$, and $TiO_2$.

In accordance with an especially preferred embodiment of the method of the invention, the matrix material in finely powdered form is mixed with a dispersion medium/solvent, especially water, to form a matrix slurry, which is then shaped and dried.

The solids content of the matrix slurry can be 50-80%, and preferably 60-70%. The specified solids content of the matrix slurry, especially 60-70%, is advantageous with respect to the subsequent drying of the shaped matrix. The higher the solids content of the matrix, the lesser is its tendency towards skin formation and the greater is the quality of the matrix obtained in this way. A high solids content of the slurry is also advantageous with respect to crack-free drying of the matrix and thus with respect to achieving greater strength.

The matrix slurry is preferably shaped by casting, spraying, rolling, or application by doctor blade.

It is advantageous for the electrolyte matrix to be incoporated in the fuel cell in the "green" state and to undergo synthesis during the fuel cell start-up.

It is advantageous for the matrix material to undergo synthesis during the fuel cell start-up, especially with the formation of lithium aluminate and lithium titanate.

It is advantageous especially for the synthesis of the electrolyte matrix to be accompanied by an increase in volume.

EXAMPLE

An embodiment of the invention is explained below:

In accordance with this embodiment, an electrolyte matrix for a molten carbonate fuel cell is produced. Before the synthesis is carried out (green state), the electrolyte matrix consists of a matrix material that contains a combination of lithium carbonate, aluminum oxide, and titanium carbide as the starting materials. In addition, the matrix material preferably contains aluminum hydroxide as a sintering aid.

The electrolyte matrix is produced by mixing the matrix material in finely powdered form with a dispersion medium/solvent to form a matrix slurry, which is then shaped and dried. The dispersion medium/solvent can be water or a different dispersion medium/solvent, but especially water, either exclusively or nonexclusively.

The matrix slurry is prepared with a solids content of 50-80%, and preferably 60-70%. The matrix slurry can be shaped by casting, spraying, rolling or application by doctor blade. After drying, the electrolyte matrix is present in a "green" state, in which it can be initially stored and/or shipped and then incorporated in the fuel cell. When the fuel cell is started up, the "green" electrolyte matrix then undergoes synthesis to form lithium aluminate and lithium titanate, accompanied by an increase in volume. One of the advantages is that no lithium aluminate is necessary in the raw material for the matrix. The reaction is described by the following reaction equations:

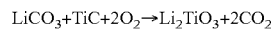

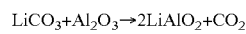

In addition to the specified components, the matrix material can contain nanoscale secondary particles, especially one or more of $ZrO_2$, $SiO_2$, $Al_2O_3$, and $TiO_2$.

After the fuel cell has been started up, i.e., in the sintered or synthesized state, the electrolyte matrix has an open porosity of 30-70%, and preferably 50-70%. The volume increase at which the material matrix undergoes synthesis during the start-up of the fuel cell is preferably 2.5-5%, and especially 3-4%.

A volume increase, i.e., a negative volume contraction of −3.5%, and an open porosity of 60% have been found to be especially effective. In this specific case, the electrolyte matrix was prepared from lithium carbonate, aluminum oxide, and titanium carbide as the components of the matrix material and aluminum hydroxide as a sintering aid.

The electrolyte matrix of the invention can be easily produced from commercially favorable materials that are already available in the required fineness. It exhibits a high degree of strength in both the "green" state and the sintered state and good storage stability in the "green" state.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. An electrolyte matrix for a molten carbonate fuel cell, which comprises a matrix material, which, in the green state, contains at least one lithium compound, aluminum oxide, and a carbide, wherein the matrix material contains a combination of lithium carbonate, aluminum oxide, and titanium carbide in the green state.

2. The electrolyte matrix in accordance with claim 1, wherein the matrix material additionally contains aluminum hydroxide.

3. The electrolyte matrix in accordance with claim 1, wherein the matrix material additionally contains nanoscale secondary particles.

4. The electrolyte matrix in accordance with claim 3, wherein the matrix material contains at least one material from the group consisting of $ZrO_2$, $SiO_2$, $Al_2O_3$, and $TiO_2$ as the nanoscale secondary particles.

5. The electrolyte matrix in accordance with claim 1, wherein the matrix material is composed to undergo synthesis, accompanied by an increase in volume, when the fuel cell is started up, and contains lithium aluminate and lithium titanate after the start-up.

6. The electrolyte matrix in accordance with claim 5, wherein the electrolyte matrix has an open porosity of 30-70% after the start-up of the fuel cell.

7. The electrolyte matrix in accordance with claim 6, wherein the open porosity is 50-70%.

8. The electrolyte matrix in accordance with claim 5, wherein the volume increase at which the matrix material undergoes synthesis during the start-up of the fuel cell is 2.5-5%.

9. The electrolyte matrix in accordance with claim 8, wherein the volume increase is 3-4%.

10. A method for producing an electrolyte matrix for a molten carbonate fuel cell, comprising producing the electrolyte matrix from a matrix material that contains a combination of lithium carbonate, aluminum oxide, and titanium carbide.

11. The method in accordance with claim 10, wherein the matrix material additionally contains aluminum hydroxide.

12. The method in accordance with claim 10, wherein the matrix material additionally contains nanoscale secondary particles.

13. The method in accordance with claim 12, wherein the matrix material contains at least one material from the group consisting of $ZrO_2$, $SiO_2$, $Al_2O_3$, and $TiO_2$ as the nanoscale secondary particles.

14. The method in accordance with claim 10, including mixing the matrix material in finely powdered form with a dispersion medium/solvent to form a matrix slurry, which is then shaped and dried.

15. The method in accordance with claim 14, wherein the matrix slurry has a solids content of 50-80%.

16. The method in accordance with claim 15, wherein the solids content is 60-70%.

17. The method in accordance with claim 14, including shaping the matrix slurry by casting, spraying, rolling, or application by doctor blade.

18. The method in accordance with claim 10, including incorporating the electrolyte matrix in the fuel cell in the "green" state, the matrix undergoing synthesis during start-up of the fuel cell.

19. The method in accordance with claim 18, wherein the matrix material undergoes synthesis during the start-up of the fuel cell with the formation of lithium aluminate and lithium titanate.

20. The method in accordance with claim 19, wherein the synthesis of the electrolyte matrix is accompanied by an increase in volume.

* * * * *